US012712194B2

(12) United States Patent
Lee et al.

(10) Patent No.: US 12,712,194 B2
(45) Date of Patent: Aug. 18, 2026

(54) POUCH-SHAPED BATTERY SEALING APPARATUS INCLUDING STOPPER AND POUCH-SHAPED BATTERY SEALING METHOD USING THE SAME

(71) Applicant: LG Energy Solution, Ltd., Seoul (KR)

(72) Inventors: Jae Ho Lee, Daejeon (KR); Yong Su Choi, Daejeon (KR); Sang Hun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 776 days.

(21) Appl. No.: 17/926,813

(22) PCT Filed: Nov. 3, 2021

(86) PCT No.: PCT/KR2021/015774

§ 371 (c)(1),
(2) Date: Nov. 21, 2022

(87) PCT Pub. No.: WO2022/098077

PCT Pub. Date: May 12, 2022

(65) Prior Publication Data

US 2023/0207856 A1 Jun. 29, 2023

(30) Foreign Application Priority Data

Nov. 5, 2020 (KR) ........................ 10-2020-0146813

(51) Int. Cl.
*H01M 10/04* (2006.01)
*B29C 65/00* (2006.01)
(Continued)

(52) U.S. Cl.
CPC ....... *H01M 10/0404* (2013.01); *B29C 66/133* (2013.01); *B29C 66/4332* (2013.01);
(Continued)

(58) Field of Classification Search
None
See application file for complete search history.

(56) References Cited

U.S. PATENT DOCUMENTS

2014/0266066 A1 9/2014 Turon Teixidor et al.
2015/0056497 A1 2/2015 Jo et al.
(Continued)

FOREIGN PATENT DOCUMENTS

CN 104154888 A 11/2014
CN 204444719 U 7/2015
(Continued)

OTHER PUBLICATIONS

International Search Report for Application No. PCT/KR2021/015774 mailed Feb. 10, 2022, pp. 1-3.

*Primary Examiner* — Niki Bakhtiari
*Assistant Examiner* — Dustin Van Kirk
(74) *Attorney, Agent, or Firm* — Lerner David LLP

(57) ABSTRACT

The present invention relates to a pouch-shaped battery sealing apparatus including a stopper capable of adjusting a thickness after sealing in a process of sealing the outer edge of a battery case made of a laminate sheet by applying heat and pressure thereto when a pouch-shaped battery is manufactured and a pouch-shaped battery sealing method using the same.

11 Claims, 7 Drawing Sheets

(51) Int. Cl.
*B29L 31/00* (2006.01)
*H01M 50/105* (2021.01)
*H01M 50/183* (2021.01)

(52) U.S. Cl.
CPC ...... *B29C 66/53461* (2013.01); *B29C 66/549* (2013.01); *B29C 66/92653* (2013.01); *B29C 66/92655* (2013.01); *H01M 50/105* (2021.01); *H01M 50/183* (2021.01); *B29L 2031/7146* (2013.01)

(56) References Cited

U.S. PATENT DOCUMENTS

| | | | |
|---|---|---|---|
| 2016/0023173 | A1 | 1/2016 | Kim et al. |
| 2016/0049682 | A1 | 2/2016 | Won et al. |
| 2017/0074634 | A1 | 3/2017 | Yoon et al. |
| 2017/0170510 | A1 | 6/2017 | Turon Teixidor et al. |
| 2018/0183088 | A1* | 6/2018 | Kim ...................... B30B 15/064 |
| 2020/0079029 | A1 | 3/2020 | Yamaura et al. |
| 2020/0303762 | A1 | 9/2020 | Turon Teixidor et al. |
| 2020/0365836 | A1 | 11/2020 | Jung et al. |
| 2020/0388800 | A1 | 12/2020 | Chae et al. |
| 2021/0194037 | A1 | 6/2021 | Turon Teixidor et al. |
| 2022/0102790 | A1 | 3/2022 | Jung et al. |

FOREIGN PATENT DOCUMENTS

| | | | | | |
|---|---|---|---|---|---|
| CN | 109398770 | A | * | 3/2019 | ............... B65B 1/06 |
| CN | 110062964 | A | | 7/2019 | |
| CN | 211507815 | U | | 9/2020 | |
| EP | 2840625 | A1 | | 2/2015 | |
| JP | 2002298799 | A | * | 10/2002 | |
| JP | 2013-166287 | A | | 8/2013 | |
| JP | 2019-175799 | A | | 10/2019 | |
| JP | 2019185929 | A | | 10/2019 | |
| KR | 20110058568 | A | | 6/2011 | |
| KR | 20150025684 | A | | 3/2015 | |
| KR | 20150089555 | A | | 8/2015 | |
| KR | 20150095387 | A | | 8/2015 | |
| KR | 20150141966 | A | | 12/2015 | |
| KR | 20160063278 | A | | 6/2016 | |
| KR | 101713075 | B1 | | 3/2017 | |
| KR | 20170046910 | A | * | 5/2017 | ........ H01M 10/0404 |
| KR | 101762807 | B1 | * | 7/2017 | ........ H01M 10/0481 |
| KR | 20170096352 | A | | 8/2017 | |
| KR | 20180028714 | A | | 3/2018 | |
| KR | 101904094 | B1 | | 10/2018 | |
| KR | 20190107383 | A | | 9/2019 | |
| KR | 20190107922 | A | | 9/2019 | |
| WO | 2015030373 | A1 | | 3/2015 | |
| WO | 2019-107408 | A1 | | 6/2019 | |
| WO | WO-2021167302 | A1 | * | 8/2021 | ............... B30B 3/02 |

* cited by examiner

【FIG. 1】
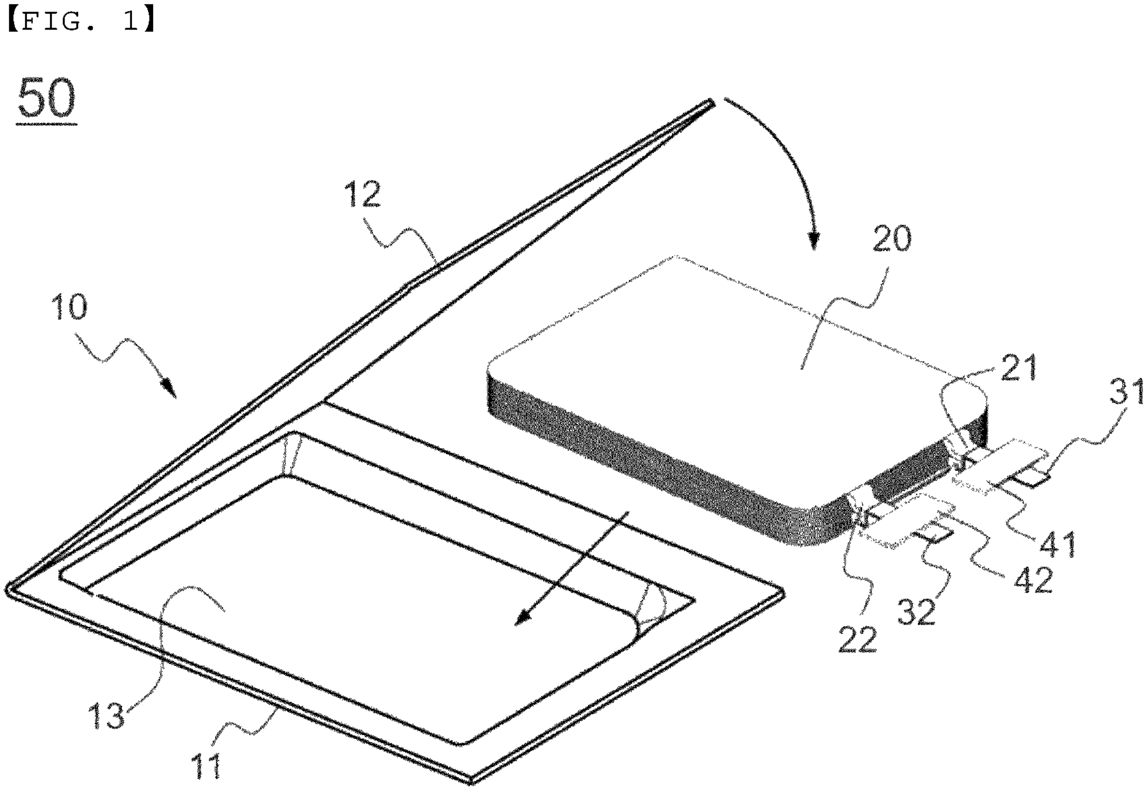

【FIG. 2】
-- Prior Art --
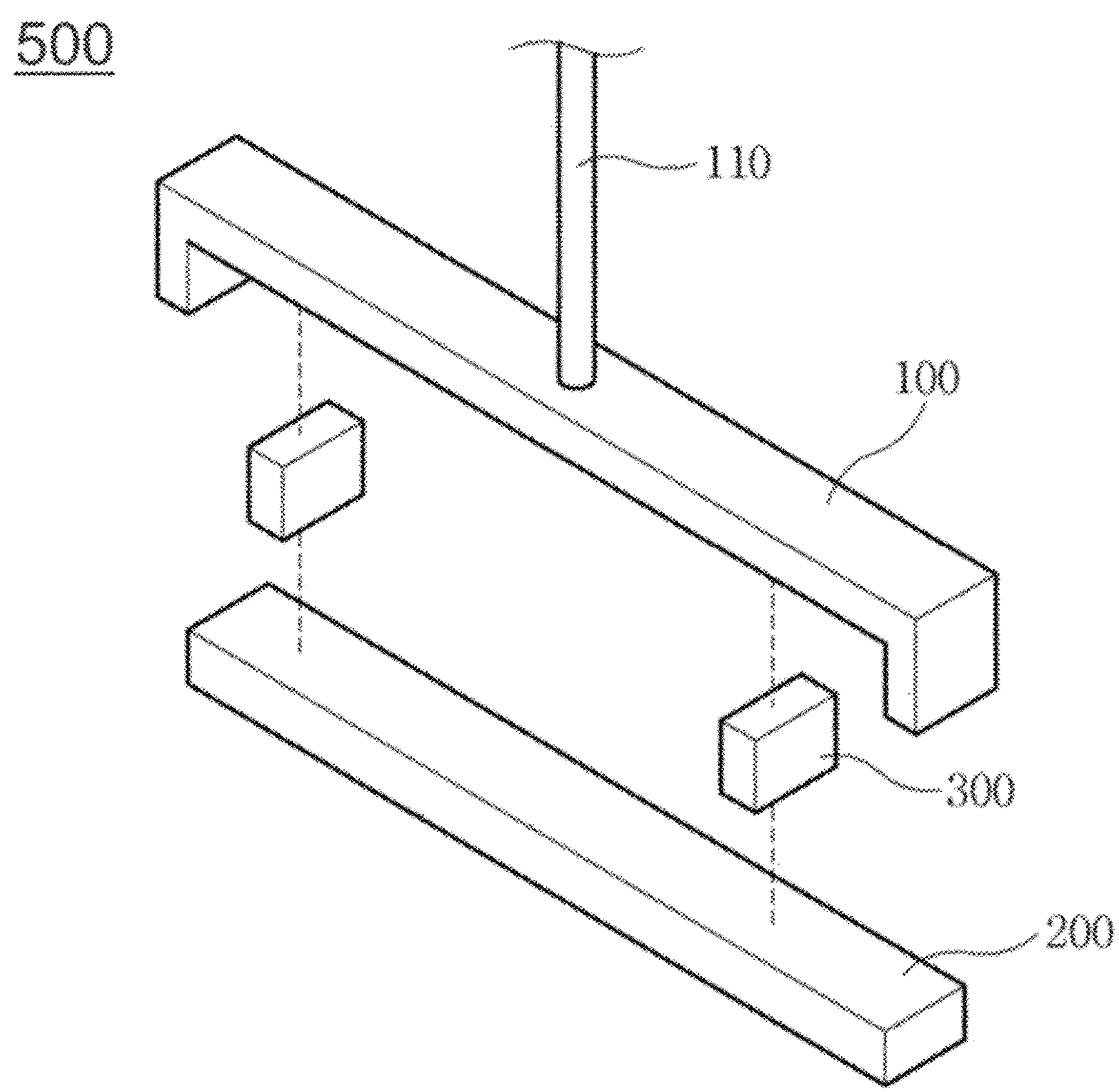

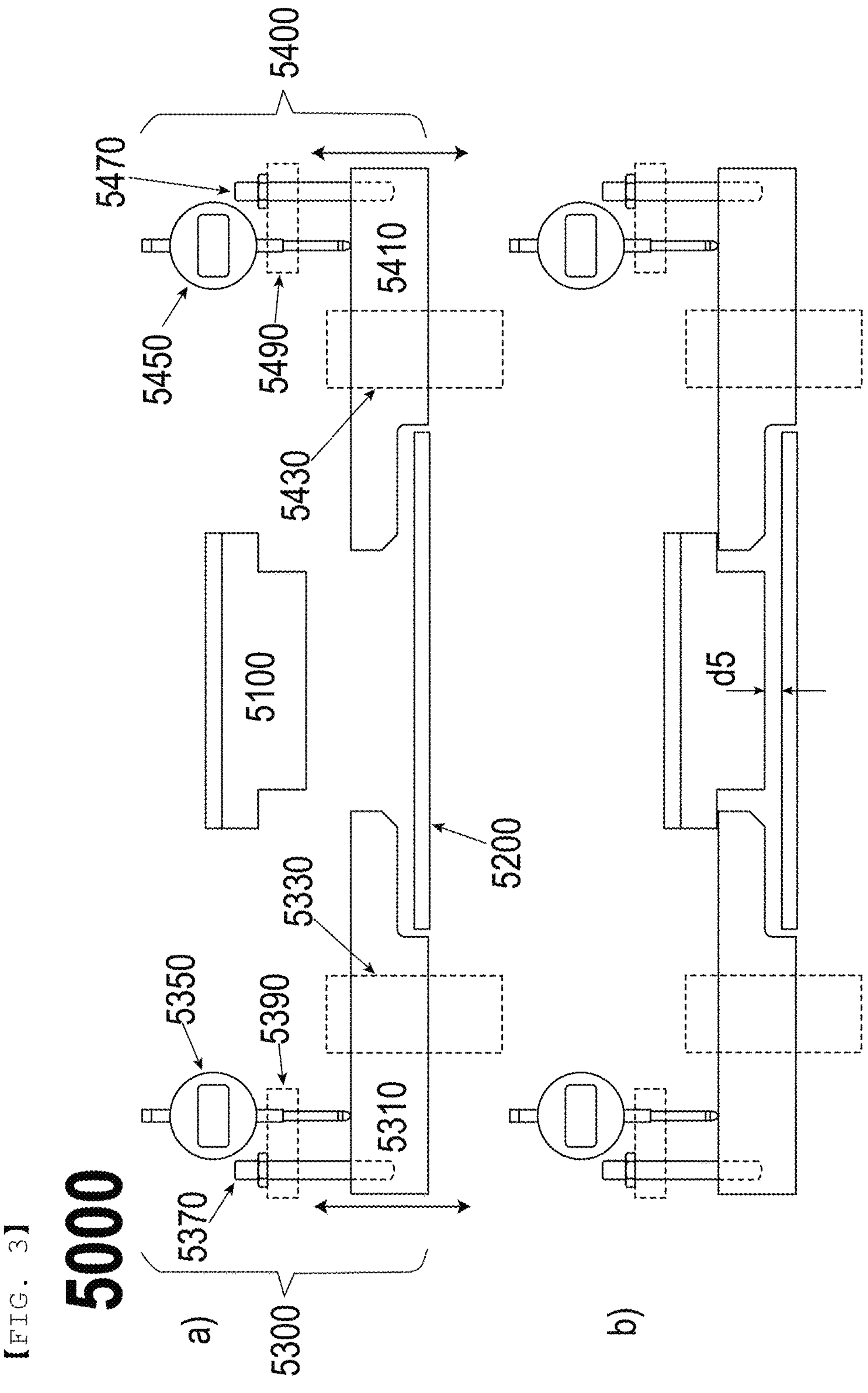
【FIG. 3】
5000
a)
b)
5100
5200
5300
5310
5330
5350
5370
5390
5400
5410
5430
5450
5470
5490
d5

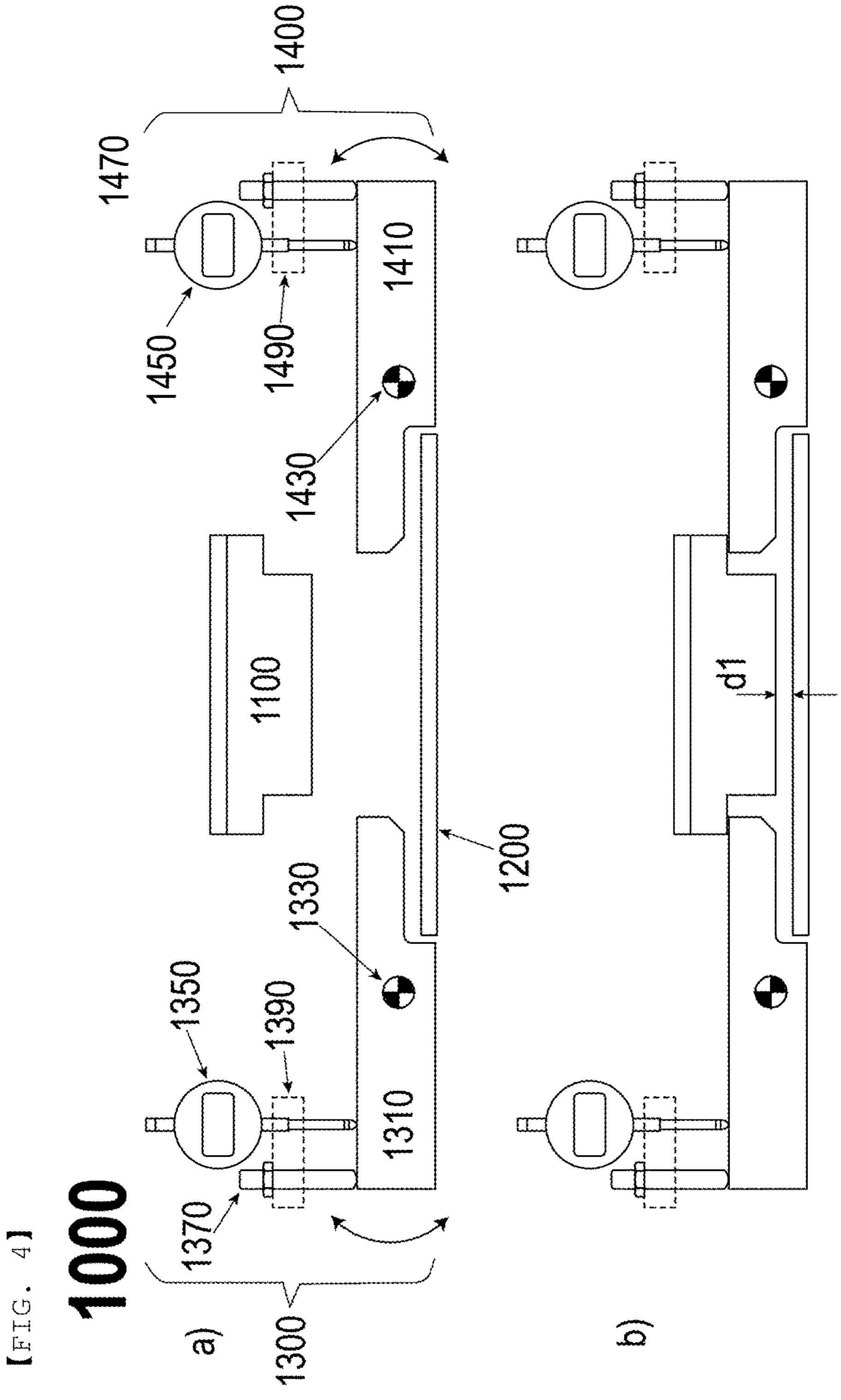
【FIG. 4】
1000
a)
b)
1100
1200
1300
1310
1330
1350
1370
1390
1400
1410
1430
1450
1470
1490
d1

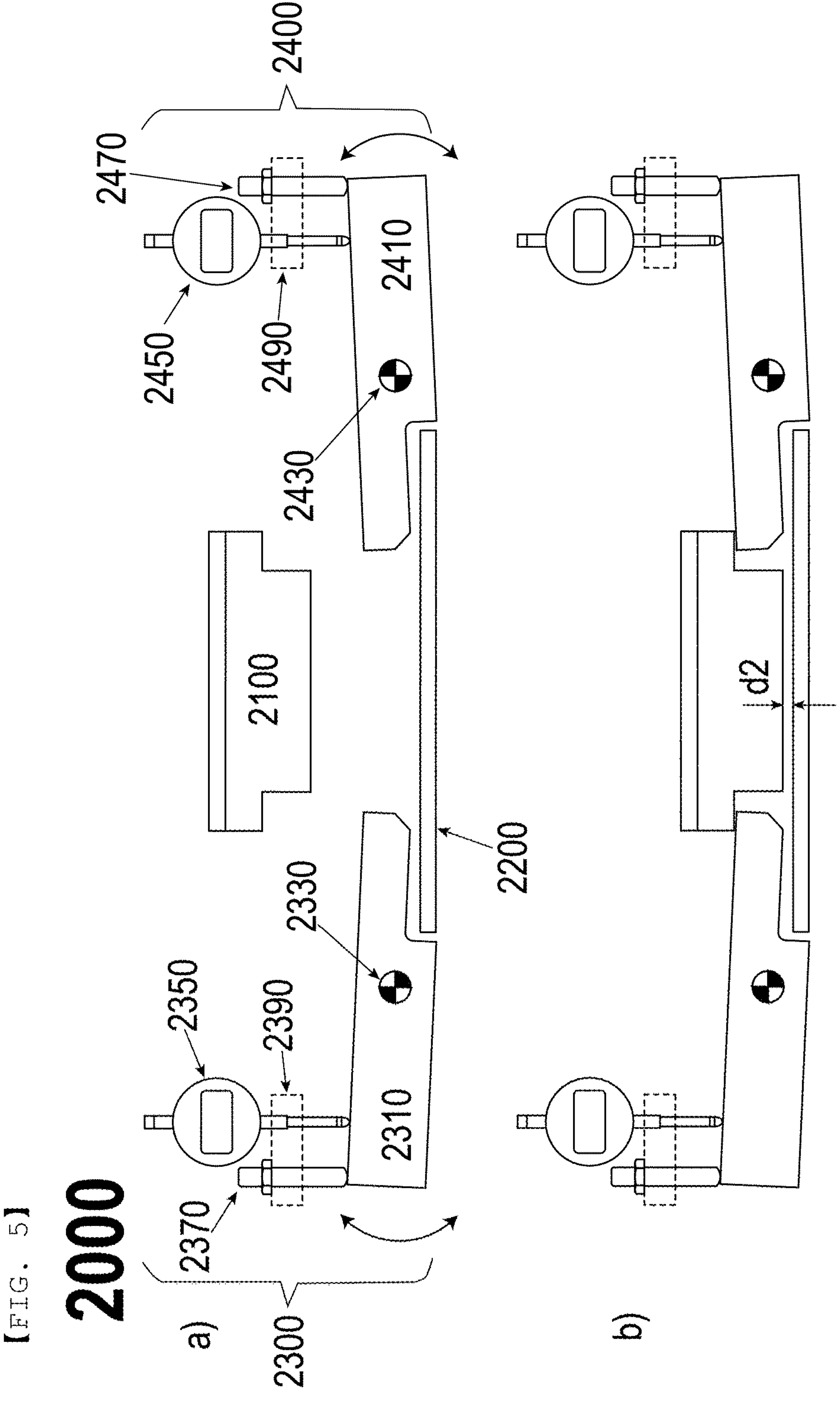
【FIG. 5】
2000
a)
b)
2100
2200
2300
2310
2330
2350
2370
2390
2400
2410
2430
2450
2470
2490
d2

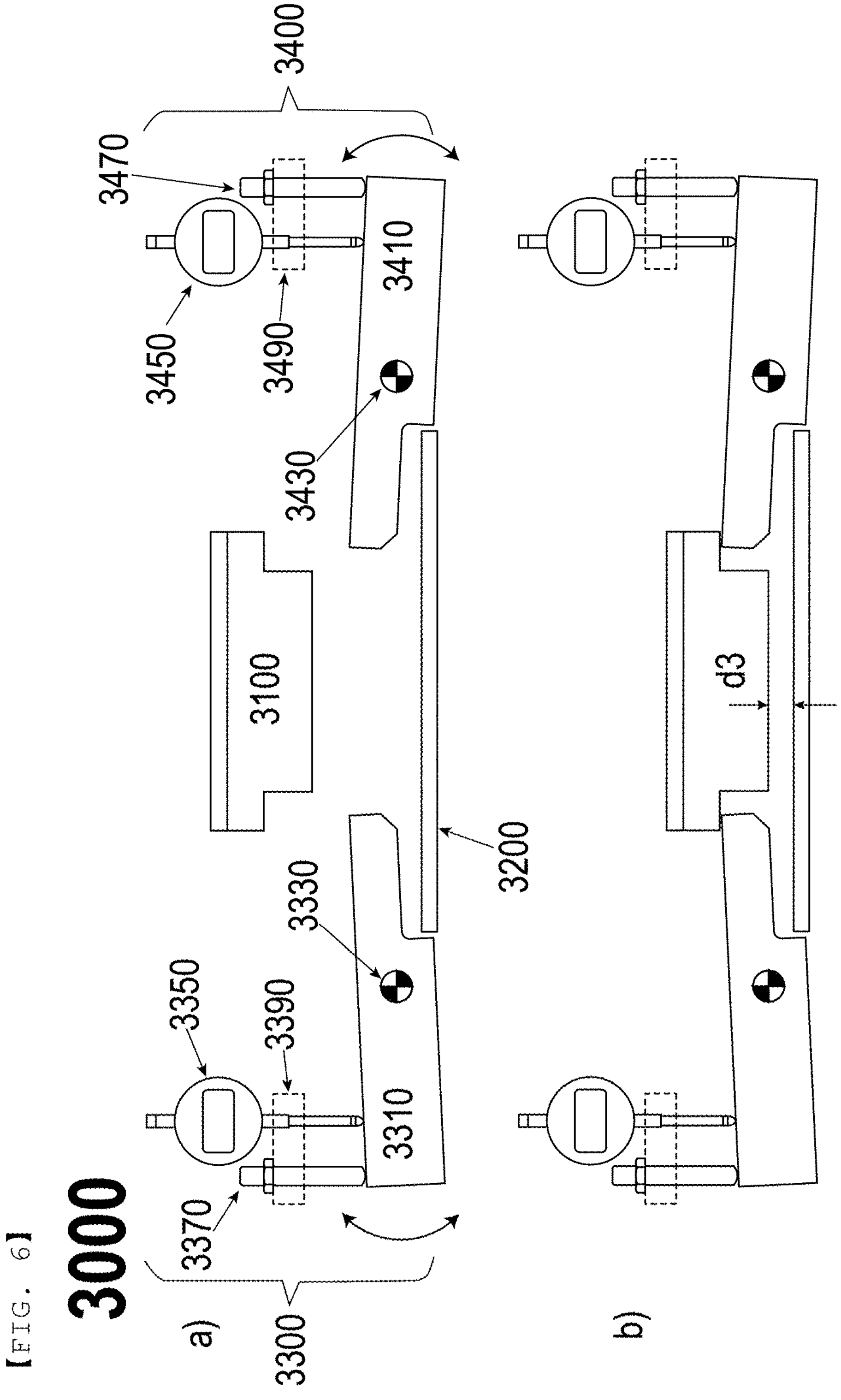
【FIG. 6】
3000
a)
b)
3100
3200
3300
3310
3330
3350
3370
3390
3400
3410
3430
3450
3470
3490
d3

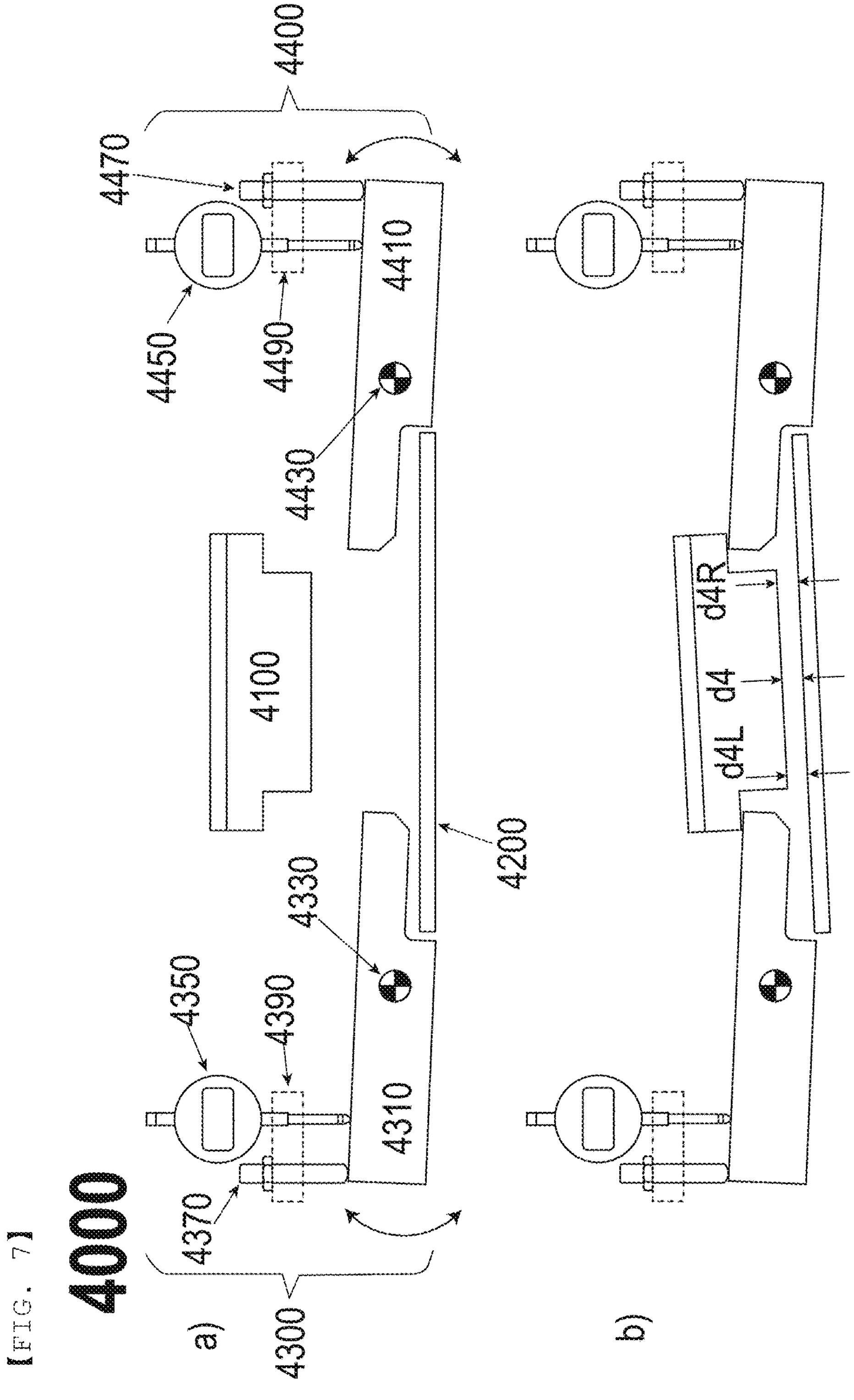
【FIG. 7】
4000
a)
b)
4400
4470
4450
4490
4410
4430
4100
4200
4330
4350
4390
4310
4370
4300
d4R
d4
d4L

POUCH-SHAPED BATTERY SEALING APPARATUS INCLUDING STOPPER AND POUCH-SHAPED BATTERY SEALING METHOD USING THE SAME

CROSS-REFERENCE TO RELATED APPLICATIONS

This application is a national stage entry under 35 U.S.C. § 371 of International Application No. PCT/KR2021/015774, filed on Nov. 3, 2021, which claims priority to Korean Patent Application No. 10-2020-0146813 filed on Nov. 5, 2020, the disclosures of which are incorporated herein by reference in their entireties.

TECHNICAL FIELD

The present invention relates to a pouch-shaped battery sealing apparatus including a stopper and a pouch-shaped battery sealing method using the same. More particularly, the present invention relates to a pouch-shaped battery sealing apparatus including a stopper capable of adjusting a thickness after sealing in a process of sealing the outer edge of a battery case made of a laminate sheet by applying heat and pressure thereto when a pouch-shaped battery is manufactured and a pouch-shaped battery sealing method using the same.

BACKGROUND ART

Demand for a secondary battery as an energy source for mobile devices, electric vehicles, etc. has abruptly increased. In particular, demand for a lithium secondary battery, which has high energy density and high discharge voltage, is high.

Based on the shape and material thereof, the lithium secondary battery may be classified as a cylindrical secondary battery made of a metal material, a prismatic secondary battery made of a metal material, or a pouch-shaped battery made of a laminate sheet. The pouch-shaped battery has advantages in that the pouch-shaped battery is stacked with high integrity, thereby having high energy density per unit weight, is manufactured at low cost, and is easily deformable. Consequently, the pouch-shaped battery is used in various devices.

In the pouch-shaped battery, a laminate sheet including an outer coating layer, a metal blocking layer, and an inner adhesive layer is generally shaped so as to be used as a battery case. An electrode assembly is received in a receiving portion formed in the laminate sheet together with an electrolytic solution, and the receiving portion is hermetically sealed to manufacture the pouch-shaped battery As shown in FIG. 1, a pouch-shaped battery 50 is configured to have a structure in which an electrode assembly 20 is mounted in a receiving portion 13 of a battery case 10 constituted by a lower pouch portion 11 and an upper pouch portion 12. In the electrode assembly 20, positive and negative electrode tabs 21 and 22 are welded respectively to two electrode leads 31 and 32 and are exposed outwards from the battery case 10. The outer edge of the case 10 is hermetically sealed in the state in which pairs of insulative films 41 and 42 are disposed on the upper surfaces and the lower surfaces of the electrode leads 31 and 32.

The outer edge of the case 10 is hermetically sealed as the result of an inner adhesive layer of a laminate sheet being melted by heat and pressed by a rectangular parallelepiped sealing tool that is long in a longitudinal direction.

FIG. 2 is an exploded perspective view of a pouch-shaped battery sealing apparatus 500 according to Patent Document 1. The outer edge of a pouch-shaped battery is disposed between a holder 100 and a sealing block 200. The holder 100, which is configured to be moved upwards and downwards by a lifting means 110, heats and fuses the outer edge of the pouch-shaped battery while being moved downwards, whereby the outer edge of the pouch-shaped battery is hermetically sealed. Since there is no separate interval or distance control means between the holder 100 and the sealing block 200, the degree of pressure applied to the pouch-shaped battery varies depending on pressure applied by the lifting means 110. If pressing is excessively performed, there occurs a thermal deformation problem in that an inner adhesive layer of a laminate sheet melts and protrudes outwards.

In Patent Document 1, in order to solve this problem, a spacing member 300 is inserted such that uniform distance between the holder 100 and the sealing block 200 is maintained, whereby the thermal deformation problem is solved.

As the result of continuous examination of the above sealing problem, the inventors have found that the distance between the holder 100 and the sealing block 200 is one of the most essential factors in sealing the pouch-shaped battery. The inventors have also found that it is possible to greatly reduce a defect rate while increasing sealing strength through adjustment of the distance therebetween. Even though the distance between the holder 100 and the sealing block 200 is changed merely a few micrometers, great difference occurs in sealing strength and a defect rate based thereon.

The distance, which is such a sensitively reactive variable, is also affected by the following various factors. It is necessary to adjust the distance between the holder 100 and the sealing block 200 depending on whether an electrode lead is disposed, the kind and thickness of a metal of a metal blocking layer of the laminate sheet, the thickness and adhesive component of the inner adhesive layer of the laminate sheet, kind and thickness of a metal of the electrode lead, the thickness and component of an insulative film, and temperatures of the holder and the sealing block.

As can also been seen from Patent Document 1, such a problem is not recognized, and the holder 100 and the sealing block 200 are spaced apart from each other by a predetermined distance merely to solve the thermal deformation problem. In the conventional art including Patent Document 1, therefore, only a spacing member of a fixed size is used.

As previously described, the inventors have found that the distance between the holder 100 and the sealing block 200 is a very important factor in sealing and that, when various sealing distances based on various process conditions are provided to this end, it is possible to greatly reduce a defect rate.

In the initial stage, the inventors tried to manufacture spacing members having various heights and to check the results of sealing based on distance using the same. However, the inventors have found that conducting experiments using spacing members, generally made of a metal material, manufactured so as to be different from each other in units of micrometers is almost physically impossible, and have derived the present invention in a process of solving this problem.

Patent Document 2 relates to a battery module manufacturing method and an instrument characteristics measurement apparatus. Patent Document 2 includes a process of measuring correspondence between load applied between a first circumferential surface of a battery cell and a second circumference of the battery cell opposite the first circumferential surface and the distance between the first circumferential surface and the second circumferential surface, a process of calculating the distance between the first circumferential surface and the second circumferential surface of first load preset in the measured correspondence, and a process of inserting the battery cell between a chassis that contacts the first circumferential surface and a support plate that contacts the second circumferential surface and mounting the support plate to the chassis in the state in which the distance between the first circumferential surface and the second circumferential surface is set to a required distance between the first circumferential surface and the second circumferential surface.

In Patent Document 2, the battery cell is compressed between the first circumferential surface and the second circumferential surface in the state in which load is added, and a core is formed between the first circumferential surface and the second circumferential surface to adjust the distance between the first circumferential surface and the second circumferential surface; however, a construction for measuring movement to calculate an exact distance, which is one of the constructions according to the present invention for solving the problem, is absent.

Patent Document 3 relates to an apparatus and method for measuring the thickness of a secondary battery cell. Patent Document 3 includes a mounting table on which a secondary battery cell, the thickness of which is to be measured, is placed; a pressing plate opposite the mounting table in the state in which the secondary battery cell is disposed therebetween, the pressing plate being installed such that the distance between the pressing plate and the mounting plate is variable; a pressing means configured to push or pull the pressing plate toward or from the mounting table in order to press the secondary battery cell placed on the mounting table in a thickness direction thereof; a measurement means configured to measure pressing force applied to the pressing plate by the pressing means and the thickness of the secondary battery cell at time intervals; and a controller configured to control charging, discharging, or temperature of the secondary battery cell according to measurement conditions input by an operator, to receive the measured pressing force value and the measured thickness value from the measurement means at time intervals, to determine the magnitude of the pressing force applied to the pressing plate and the thickness of the secondary battery cell, to store the determined magnitude of the pressing force and the determined thickness of the secondary battery cell in a memory together with time information, and to maintain or change pressing force applied to the pressing plate by the pressing means during measurement of the thickness of the secondary battery cell.

Patent Document 3 relates to merely an apparatus for measuring the thickness of the secondary battery cell, and thus cannot be a solution to the problem to be solved by the present invention.

Patent Document 4 relates to a clamping device for stacking electrochemical cells, and Patent Document 5 relates to a battery cell pressing apparatus and a battery cell pressing method using the same. These patent documents do not describe whether to measure the distance.

As described above, a measurement apparatus capable of accurately adjusting the distance between a holder and a sealing block and determining the degree of sealing based thereon in sealing a pouch-shaped battery, recognized as an important problem in the present invention, and a measurement method using the same have not yet been suggested.

Korean Patent Application Publication No. 2015-0025684 (2015 Mar. 11) ("Patent Document 1")

Japanese Patent Application Publication No. 2019-185929 (2019 Oct. 24) ("Patent Document 2")

Korean Patent Application Publication No. 2016-0063278 (2016 Jun. 3) ("Patent Document 3")

Korean Patent Application Publication No. 2015-0141966 (2015 Dec. 21) ("Patent Document 4")

Korean Patent Application Publication No. 2015-0089555 (2015 Aug. 5) ("Patent Document 5")

DISCLOSURE

Technical Problem

The present invention has been made in view of the above problems, and it is an object of the present invention to provide a pouch-shaped battery sealing apparatus capable of accurately adjusting the distance between a holder and a sealing block and the degree of sealing based thereon in a process of sealing the outer edge of a battery case made of a laminate sheet by applying heat and pressure thereto when a pouch-shaped battery is manufactured and a pouch-shaped battery sealing method using the same.

Technical Solution

In order to accomplish the above object, the present invention provides a pouch-shaped battery sealing apparatus including an upper sealing block, a lower sealing block, and a stopper unit configured to maintain the minimum distance between the upper sealing block and the lower sealing block, wherein the stopper unit includes a stopper configured to contact the upper sealing block in order to prevent downward movement of the upper sealing block; a support shaft disposed at at least one side of the upper sealing block, the support shaft being configured to allow the stopper to support the upper sealing block while changing the position thereof through upward and downward movement or rotational movement; a measurement portion configured to measure a movement change of the stopper; and a height adjustment portion configured to adjust the position at which the stopper is fixed.

The stopper unit may be disposed at left and right surfaces of the upper sealing block in a symmetrical fashion while having an identical construction.

The measurement portion may be a micrometer configured to measure the upward and downward movement distance of the stopper, and the height adjustment portion may adjust the height of the stopper through rotation of a screw thereof.

In another aspect, the pouch-shaped battery sealing apparatus may further include a fixing portion configured to fix the height adjustment portion and the measurement portion at constant positions from the lower sealing block.

The support shaft may be disposed between the upper sealing block and the measurement portion and the height adjustment portion, the support shaft may be disposed perpendicular to a plane at which the lower sealing block is fixed, and the support shaft may be provided with a guide configured to allow the stopper to be horizontally moved along the support shaft or a rotation shaft configured to allow the stopper to be rotated about the support shaft.

The stopper may be provided at each of left and right sides of the upper sealing block, and the left and right distance between the upper sealing block and the lower sealing block may be differently fixed by the stopper.

The stopper may be provided at each of left and right sides of the upper sealing block, and a plane at which the upper sealing block is fixed may be inclined by the stopper.

In a further aspect, the present invention provides a method of adjusting the sealing thickness of a pouch-shaped battery using the pouch-shaped battery sealing apparatus.

In addition, the present invention may provide all possible combinations of the above solving means.

Advantageous Effects

As is apparent from the above description, the present invention provides a pouch-shaped battery sealing apparatus capable of accurately adjusting the distance between a holder and a sealing block and the degree of sealing based thereon in a process of sealing the outer edge of a battery case made of a laminate sheet by applying heat and pressure thereto when a pouch-shaped battery is manufactured and a pouch-shaped battery sealing method using the same.

In the present invention, height adjustment is accurately performed by a height adjustment portion and a change in height is observed by a measurement portion. Consequently, it is possible to accurately and constantly adjust a sealing distance, whereby it is possible to provide consistent results.

Left and right stoppers according to the present invention are individually adjusted. When a lower sealing block is not horizontal, therefore, it is possible to adjust an upper sealing block based on the state of the lower sealing block.

Each stopper according to the present invention has a constant position, since a rotation shaft thereof is fixed, and the upper sealing block is supported by the height adjustment portion and the measurement portion according to the lever principle, whereby fixing force is very high while height adjustment is easily performed.

DESCRIPTION OF DRAWINGS

FIG. 1 is an exploded perspective view of a conventional pouch-shaped battery.

FIG. 2 is an exploded perspective view of a pouch-shaped battery sealing apparatus according to Patent Document 1.

FIG. 3 is a sectional view of a pouch-shaped battery sealing apparatus according to a first embodiment of the present invention.

FIG. 4 is a sectional view showing a first operation example of a pouch-shaped battery sealing apparatus according to a second embodiment of the present invention.

FIG. 5 is a sectional view showing a second operation example of the pouch-shaped battery sealing apparatus according to the second embodiment of the present invention.

FIG. 6 is a sectional view showing a third operation example of the pouch-shaped battery sealing apparatus according to the second embodiment of the present invention.

FIG. 7 is a sectional view showing a fourth operation example of the pouch-shaped battery sealing apparatus according to the second embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described with reference to the accompanying drawings.

FIG. 3 is a sectional view of a pouch-shaped battery sealing apparatus 5000 according to a first embodiment of the present invention, showing operation examples a) and b) thereof.

The pouch-shaped battery sealing apparatus according to the present invention includes an upper sealing block 5100, a lower sealing block 5200, and stopper units 5300 and 5400 configured to maintain the minimum distance between the upper sealing block 5100 and the lower sealing block 5200. In FIGS. 3 to 7, a left stopper unit and a right stopper unit, which have the same construction, are disposed at left and right sides in a symmetrical fashion.

The stopper units 5300 and 5400 include stoppers 5310 and 5410 configured to contact the upper sealing block 5100 in order to prevent downward movement of the upper sealing block 5100; support shafts 5330 and 5430 disposed at at least one side of the upper sealing block 5100, the support shafts being configured to allow the stoppers 5310 and 5410 to support the upper sealing block 5100 while changing the positions thereof through upward and downward movement; measurement portions 5350 and 5450 configured to measure movement changes of the stoppers 5310 and 5410; and height adjustment portions 5370 and 5470 configured to adjust positions at which the stoppers 5310 and 5410 are fixed.

The measurement portions 5350 and 5450 are micrometers configured to measure upward and downward movement distances of the stoppers 5310 and 5410. The height adjustment portions 5370 and 5470 adjust the heights of the stoppers 5310 and 5410 through rotation of screws thereof.

When the distance for sealing of the pouch-shaped battery is changed in units of micrometers, there is a difference in the degree of sealing and a defect rate. In order to measure variation of the height, the micrometers are used.

In a first embodiment of the present invention, the stoppers 5310 and 5410 are moved upwards and downwards along the support shafts 5330 and 5430 in parallel to each other. To this end, the support shafts 5330 and 5430 are provided with guides (not shown) configured to allow the stoppers 5310 and 5410 to be moved therealong.

The height adjustment portions 5370 and 5470 are fixed to through-holes formed in the stoppers 5310 and 5410, the through-holes being provided with screw threads, in a screw-engagement manner. When the screws of the height adjustment portions 5370 and 5470 are rotated, the stoppers 5310 and 5410 move upwards and downwards in response thereto.

To this end, the height adjustment portions 5370 and 5470 and the measurement portions 5350 and 5450 are fixed to fixing portions 5390 and 5490 so as to be located at constant positions from the lower sealing block 5200. As a result, it is possible to adjust the heights of the stoppers 5310 and 5410 and, at the same time, to accurately measure change values for height adjustment.

The lower figure b) of FIG. 3 shows that the upper sealing block 5100 and the lower sealing block 5200 are constantly adjusted so as to have a distance of d5 therebetween by the stoppers 5310 and 5410.

FIG. 4 is a sectional view showing a first operation example 1000 of a pouch-shaped battery sealing apparatus according to a second embodiment of the present invention, FIG. 5 is a sectional view showing a second operation example 2000 of the pouch-shaped battery sealing apparatus according to the second embodiment of the present invention, FIG. 6 is a sectional view showing a third operation example 3000 of the pouch-shaped battery sealing apparatus according to the second embodiment of the present invention, and FIG. 7 is a sectional view showing a fourth operation example 4000 of the pouch-shaped battery sealing apparatus according to the second embodiment of the present invention.

The pouch-shaped battery sealing apparatus according to the first embodiment of the present invention and the pouch-shaped battery sealing apparatus according to the second embodiment of the present invention are different from each other in terms of stopper movement. In the first embodiment, the entireties of the stoppers 5310 and 5410 move upwards and downwards along the support shafts 5330 and 5430 in parallel to each other.

In the second embodiment, stoppers are rotated about rotation shafts 1330, 2330, 3330, 4330, 1430, 2430, 3430, 4430 provided at support shafts (not shown).

In the second embodiment, the stoppers perform rotational movement, unlike the first embodiment. Consequently, values measured by measurement portions are not used as they are, distances from the rotation shafts are measured, and distances d1, d2, d3, d4, d4L, and d4R between an upper sealing block and a lower sealing block are calculated through an arithmetic expression thereof, or the distances d1, d2, d3, d4, d4L, and d4R between the upper sealing block and the lower sealing block are calculated through correlation between the values measured by the measurement portions and the measured actual distance between the upper sealing block and the lower sealing block.

FIG. 4 shows that an upper sealing block 1100 is fixed in the state in which both stoppers 1310 and 1410 are horizontal, FIG. 5 shows that an upper sealing block 2100 is fixed in the state in which both stoppers 2310 and 2410 are moved downwards as the result of rotational movement, and FIG. 6 shows that an upper sealing block 3100 is fixed in the state in which both stoppers 3310 and 3410 are moved upwards as the result of rotational movement. FIG. 7 shows that an upper sealing block 4100 is fixed in the state in which one of stoppers 4310 and 4410 is moved upwards and the other stopper is moved downwards as the result of rotational movement. Consequently, the same distances are maintained even in the state in which a lower sealing block is not horizontal. It can be seen that d4, d4L, and d4R are equal to each other.

Those skilled in the art to which the present invention pertains will appreciate that various applications and modifications are possible within the category of the present invention based on the above description.

DESCRIPTION OF REFERENCE SYMBOLS

10: Battery case
11: Lower portion
12: Upper portion
13: Receiving portion
20: Electrode assembly
21, 22: Electrode tabs
31, 32: Electrode leads
41, 42: Insulative films
50: Pouch-shaped battery
100: Holder
110: Lifting means
200: Sealing block
300: Spacing member
500: Conventional pouch-shaped battery sealing apparatus
1000: First operation example of pouch-shaped battery sealing apparatus according to second embodiment of present invention
2000: Second operation example of pouch-shaped battery sealing apparatus according to second embodiment of present invention
3000: Third operation example of pouch-shaped battery sealing apparatus according to second embodiment of present invention
4000: Fourth operation example of pouch-shaped battery sealing apparatus according to second embodiment of present invention
5000: Operation example of pouch-shaped battery sealing apparatus according to first embodiment of present invention
1100, 2100, 3100, 4100, 5100: Upper sealing blocks
1200, 2200, 3200, 4200, 5200: Lower sealing blocks
1300, 2300, 3300, 4300, 5300: Left stopper units
1400, 2400, 3400, 4400, 5400: Right stopper units
1310, 2310, 3310, 4310, 5310: Left stoppers
1410, 2410, 3410, 4410, 5410: Right stoppers
1330, 2330, 3330, 4330: Left rotation shafts
1430, 2430, 3430, 4430: Right rotation shafts
5330: Left support shaft
5430: Right support shaft
1350, 2350, 3350, 4350, 5350, 1450, 2450, 3450, 4450, 5450: Measurement portions
1370, 2370, 3370, 4370, 5370, 1470, 2470, 3470, 4470, 5470: Height adjustment portions
1390, 2390, 3390, 4390, 5390, 1490, 2490, 3490, 4490, 5490: Fixing portions
d1, d2, d3, d4, d4L, d4R, d5: Distances between upper sealing blocks and lower sealing blocks

INDUSTRIAL APPLICABILITY

The present invention relates to a pouch-shaped battery sealing apparatus including a stopper capable of adjusting a thickness after sealing in a process of sealing the outer edge of a battery case made of a laminate sheet by applying heat and pressure thereto when a pouch-shaped battery is manufactured and a pouch-shaped battery sealing method using the same, and therefore the present invention has industrial applicability.

The invention claimed is:

1. A pouch-shaped battery sealing apparatus comprising an upper sealing block, a lower sealing block, and a stopper unit configured to limit a minimum distance between the upper sealing block and the lower sealing block, wherein the stopper unit comprises:

a first stopper disposed at a first side of the upper sealing block and configured to contact the upper sealing block in order to prevent downward movement of the upper sealing block beyond a predetermined limit;

a support shaft disposed at the first side of the upper sealing block, the support shaft being translationally coupled to the first stopper, the support shaft having a fixed position relative to the lower sealing block;

a measurement portion configured to measure a movement change of the first stopper relative to the lower sealing block; and a height adjustment portion configured to adjust a translational position at which the first stopper is disposed relative to the lower sealing block, the height adjustment portion being threadedly coupled to a threaded opening formed in the first stopper, the height adjustment portion being configured such that rotation thereof causes the first stopper to move along the support shaft.

2. The pouch-shaped battery sealing apparatus according to claim 1, wherein the stopper unit has a second stopper configured to prevent downward movement of the upper sealing block beyond the predetermined limit, the second stopper being disposed at a second side of the upper sealing block, the first and second stoppers being positioned symmetrical with one another about the upper sealing block and having an identical construction as one another.

3. The pouch-shaped battery sealing apparatus according to claim 1, wherein the measurement portion is a micrometer configured to measure an upward or downward movement distance of the first stopper.

4. The pouch-shaped battery sealing apparatus according to claim 1, wherein the height adjustment portion is configured to adjust the translational position of the first stopper by rotation of a screw thereof.

5. The pouch-shaped battery sealing apparatus according to claim 1, further comprising a fixing portion configured to fix a position of the height adjustment portion and the measurement portion relative to the lower sealing block.

6. The pouch-shaped battery sealing apparatus according to claim 1, wherein the support shaft is disposed between a first location of the upper sealing block and a second location of the measurement portion and the height adjustment portion.

7. The pouch-shaped battery sealing apparatus according to claim 1, wherein the support shaft has a longitudinal axis disposed perpendicular to a surface of the lower sealing block facing towards the upper sealing block.

8. The pouch-shaped battery sealing apparatus according to claim 7, wherein the support shaft comprises a guide configured to receive translation of the stopper along the support shaft.

9. The pouch-shaped battery sealing apparatus according to claim 1, wherein the stopper unit has a second stopper configured to prevent downward movement of the upper sealing block beyond the predetermined limit, the second stopper being disposed at a second side of the upper sealing block, the first and second stoppers together being configured such that a first distance between the first side of the upper sealing block and the lower sealing block is different than a second distance between the second side of the upper sealing block and the lower sealing block.

10. The pouch-shaped battery sealing apparatus according to claim 1, wherein the stopper unit has a second stopper configured to prevent downward movement of the upper sealing block beyond the predetermined limit, the second stopper being disposed at a second side of the upper sealing block, the first and second stoppers together being configured such that a first plane defining a largest surface of the upper sealing block is inclined relative to a second plane defining a largest surface of the lower sealing block.

11. A method of adjusting a sealing thickness of a pouch-shaped battery using the pouch-shaped battery sealing apparatus according to claim 1.

* * * * *